US005417527A

United States Patent [19]

Wienhold

[11] Patent Number: 5,417,527

[45] Date of Patent: May 23, 1995

[54] QUICK CHANGE CHUCK ASSEMBLY FOR TOOL BITS

[76] Inventor: James L. Wienhold, 3336 Idaho Ave. South, St. Louis Park, Minn. 55426

[21] Appl. No.: 289,887

[22] Filed: Aug. 12, 1994

[51] Int. Cl.$^6$ ....................... B23B 31/03; B23B 31/113

[52] U.S. Cl. .................................. 408/239 R; 279/75; 279/89; 279/905

[58] Field of Search .................... 279/75, 89, 904, 905; 408/226, 239 R, 239 A, 240

[56] References Cited

U.S. PATENT DOCUMENTS

| | | | |
|---|---|---|---|
| Re. 31,755 | 12/1984 | Wanner et al. | 464/167 |
| 81,260 | 8/1868 | Davis . | |
| 1,602,708 | 10/1926 | Russell . | |
| 2,350,565 | 6/1944 | Mills | 279/76 |
| 2,370,487 | 2/1945 | Poutie | 279/42 |
| 2,736,562 | 2/1956 | Blackburn | 279/76 |
| 2,767,992 | 10/1956 | Emrick | 279/82 |
| 2,807,473 | 9/1957 | Kiehne | 279/82 |
| 2,926,020 | 2/1960 | Dayton et al. | 279/75 |
| 2,987,334 | 6/1961 | Wendling | 287/119 |
| 3,255,792 | 6/1966 | Beck | 145/64 |
| 3,367,727 | 2/1968 | Ward et al. | 306/28 |
| 3,583,715 | 6/1971 | Jahrl | 279/75 |
| 3,672,692 | 6/1972 | Fauth | 279/82 |
| 3,945,653 | 3/1976 | Faichle | 279/97 |
| 4,209,182 | 6/1980 | Sheldon | 279/75 |
| 4,290,617 | 9/1981 | Yoshida | 279/75 |
| 4,434,859 | 3/1984 | Rumpp et al. | 173/48 |
| 4,577,875 | 3/1986 | Miyakawa | 279/75 |
| 4,588,335 | 5/1986 | Pearson, Jr. | 408/239 R |
| 4,594,036 | 6/1986 | Hogenhout | 408/240 |
| 4,629,375 | 12/1986 | Lieser | 279/75 |
| 4,692,073 | 9/1987 | Martindell | 408/239 A |
| 4,900,202 | 2/1990 | Weinhold | 408/240 |
| 4,990,038 | 2/1991 | DeLong | 408/226 |
| 5,013,194 | 5/1991 | Wienhold | 408/240 |

OTHER PUBLICATIONS

Brochure entitled "Insty-Bit Patented Quick Change System," 1993/1994, by Wienhold Associates, Minneapolis, Minn. 55426.

*Primary Examiner*—Steven C. Bishop
*Attorney, Agent, or Firm*—Kinney & Lange

[57] ABSTRACT

A quick change chuck assembly for tool bits uses a bayonet style lock. The assembly is constructed with a bore that receives a multi-faceted shank of a tool bit. Rotating the shank within the bore locks the shank in place, preventing undesired axial extraction of the tool bit from the assembly.

16 Claims, 4 Drawing Sheets

QUICK CHANGE CHUCK ASSEMBLY FOR TOOL BITS

BACKGROUND OF THE INVENTION

This invention relates to chuck assemblies for tool bits and, more particularly, to a quick release chuck adapted to prevent undesired axial extraction of a tool bit such as a drill from the chuck assembly. The invention enables users to change tool bits in the chuck assembly quickly and easily.

Tool bits include tools used for drilling and for driving fastener devices such as screws, nuts and bolts, and other work elements requiring rotational motion. The American National Standards Institute has a specification, own as ANSI B107.4-1982, which pertains to the driving and spindle ends for portable powered and hand held machines using the tool bits. Tool bits in accordance with the specification have a hexagonally configured shank with a circumferential groove formed into the shank. The circumferential groove has a flat, bosom portion disposed between two radiused shoulder portions. The standard reflects the long term and pervasive use of such tool bits and the large inventory of tools available.

It has long been recognized that the ability to quickly change tool bits in the spindle of a power source is an advantageous feature. Numerous examples exist in the art of quick release tool chucks. An example of one such quick release chuck apparatus is described in U.S. Pat. No. 4,692,073. The quick release chuck disclosed therein includes a spring biased sleeve disposed on a spindle having an inclined cam surface disposed against a single ball.

The ball in turn applies normal and tangential forces against a groove in the shank of the tool bit to hold the tool bit in a bore. The sleeve is urged into contact with the ball by a compression spring disposed between the spindle and the sleeve. A ring secured to the spindle limits the movement of the sleeve in one direction, and the compression spring and the spindle limit the movement of the sleeve in the opposite direction.

U.S. Pat. No. 4,692,073 addresses objectionable end play caused by the presence of the flat, bottomed portion of the circumferential groove in the tool bits. However, construction of devices taught by the patent require maintenance of extremely tight manufacturing standards with respect to the radius of the ball and both the radius of the radial bore it travels in and the radius of the radiused shoulders in the groove which it abuts against. The ramped sleeve which is used to apply normal and tangential forces to the ball can allow the ball to be forced out of the retaining position by a large outward axial force applied to the tool. A large outward axial force can occur, for example, where the tool bit is a drill bit being removed from a freshly drilled bore. Use of a single detent ball can also result in a nonconcentric orientation of the tool.

U.S. Pat. No. 5,013,194 discloses a chuck assembly for a tool bit including a spindle with a quick release mechanism adapted to prevent undesired axial extraction of the tool bit from the spindle. The tool bit includes a shank portion with a circumferential groove in accordance with the ANSI standard. A longitudinally extending bore is provided in the spindle for receiving the shank portion of the tool bit. Opposing radial bores communicate with the shank receiving bore. Detent balls are disposed in the opposing radial bores. The shank is retained in the bore by the balls, which extend from the radial bores into the shank receiving bore and against the circumferential groove of the shank.

The detent balls' disposition in opposing positions around the shank help center the shank. A spring biased shoulder is urged against the balls, locking them against a retaining face. Attempted axial extraction of the tool bit from the bore, without release of the detent balls, pulls the balls against a retaining face, thereby producing an opposite tangential force to the axial retraction force. The responsive tangential force prevents extraction of the tool bit from the shank receiving bore.

The existing quick change chuck assembly designs employ relatively bulky locking mechanisms which result in the assembly protruding beyond the nose of the standard drill chuck in a manner which may cause interference during use of the chuck assembly. Further, these prior art chuck assemblies have an outer diameter wider than the standard chuck. The operation of the systems also requires the user to manipulate a portion of the adaptor while inserting the tool bit. As a consequence, these systems can sometimes be bulky or cumbersome for use in particular applications. Additionally, the prior art systems require the production and assembly of many small parts, which increases the difficulty and cost of producing the quick change chuck assembly.

SUMMARY OF THE INVENTION

The present invention is a quick change chuck assembly for tool bits utilizing a bayonet style lock. The assembly is constructed with a bore that receives a multifaceted shank of a tool bit. Rotating the shank within the bore locks the shank in place, preventing undesired axial extraction of the tool bit from the assembly.

The tool bit shank is inserted into the bore of the chuck assembly and guided by one or more splines that run longitudinally along the inner wall of the bore. Within the bore lies a radially inwardly extending shoulder having a number of faces with which the sides of the shank may be aligned. To insert the shank past the shoulder it is necessary to rotate the shank such that the sides of the shank align with the faces of the shoulder. At the end of the bore is an end stop which is positioned such that the radial shoulder aligns with a radiused groove extending circumferentially about the shank. When fully inserted into the bore, the shank may be rotated such that a lower edge of the shank is positioned under a face of the shoulder. Attempted axial extraction of the tool bit shank from the bore without subsequent rotation of the shank presses the lower edge of the shank against the shoulder face, producing an opposite tangential force to the axial retraction force. The responsive tangential force prevents the extraction of the tool bit shank from the bore.

DETAILED DESCRIPTION OF THE PREFERRED EMBODIMENTS

Figure 1:
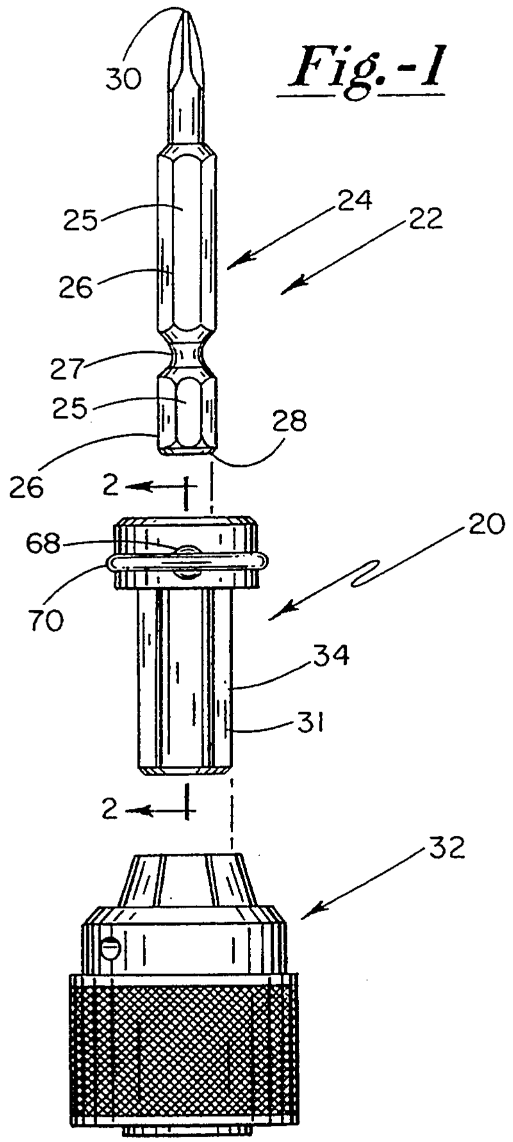
FIG. 1 is a exploded elevational view of a tool bit, the quick change chuck assembly of the present invention, and an adjustable jaw chuck.

FIG. 1 depicts a quick change chuck assembly 20 for use with a tool bit 22 having a hex-shaped shank 24 with sides 25 and edges 26, as well as a radiused groove 27 extending circumferentially about the shank 24. Shank 24 conforms to ANSI standard B107.4. The tool bit also has a base 28 and a tip 30. While the FIGURES depict tip 30 as a screw driver, tip 30 could take other forms such as a drill bit nut socket, arbor, or any other tool which is rotationally driven. Quick change chuck assembly 20 includes a spindle 34 which fits into an adjustable jaw chuck 32. Spindle 34 includes flat exterior faces 31 which align with the jaws of adjustable jaw chuck 32 to form a secure connection.

Figure 2:
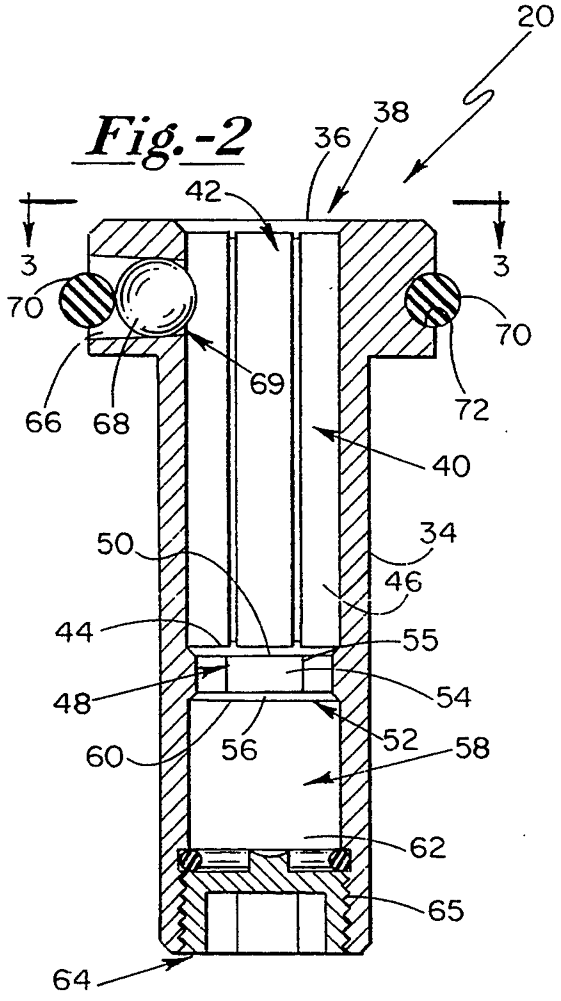
FIG. 2 is a sectional view of the quick change chuck assembly along line 2—2 of FIG. 1.

FIG. 2 shows a sectional view of quick change chuck assembly 20 along line 2—2 of FIG. 1. Chuck assembly 20 has a forward face 36 which opens into a longitudinal bore 38. Bore 28 has a first segment 40 extending from a first end 42 to a second end 44. Six evenly spaced splines 46 extend along first segment 40 from first end 42, which is adjacent forward face 36, to second end 44. Splines 46 limit the rotational movement of shank 24 within bore 38. In alternative embodiments, first segment 40 has between one and five splines.

Bore 38 has a second segment 48 extending from a first end 50. The first end 50 of second segment 48 is adjacent second end 44 of first segment 40. Second segment 48 consists of a radial inwardly extending shoulder 52 with six evenly sized faces 54 and six edges 55, each edge 55 representing the intersection of two faces 54. Shoulder 52 extends to a second end 56 of second segment 48. In an alternative embodiment, shoulder 52 has at least one face.

Adjacent the shoulder 52 of second segment 48 a third segment 58. The third segment 58 extends from a first end 60 to a second end 62. An end stop 64 is positioned within bore 38 adjacent second end 62 of third segment 58. Preferably, end stop 64 is adjustable within an internally threaded portion 65 of second end 62. Alternatively, end stop 64 may be permanently fixed to second end 62. Although third segment 58 is depicted as a smooth bore, third segment 58 may alternatively include a number of splines less than or equal to the number of edges 26 on shank 24. The splines in third segment 58 would be longitudinally aligned with splines 46 in first segment 40.

A radial bore 66 extends through spindle 34 into bore 38 adjacent the first end 42 of the first segment 40. Radial bore 66 is positioned between two splines 46 such that a detent ball 68 may extend into bore 38 between two splines 46. Opening 69 of radial bore 66 is sized to prevent detent ball 68 from entering fully into bore 38. An O-ring 70 positioned within a circumferential groove 72 about spindle 34 urges detent ball 68 into bore 38. Detent ball 68 is a biasing mechanism that guides shank 24 as it is inserted into bore 38 and prevents unwanted radial rotation of shank 24. Alternative biasing mechanisms could include a metal clip, spring wire, or other similar means instead of O-ring 70 and detent ball 68.

Figure 3:
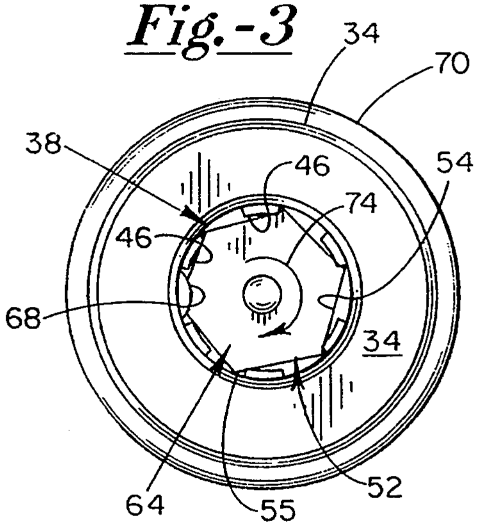
FIG. 3 is an end view of the quick change chuck assembly along line 3—3 of FIG. 2.

FIG. 3 shows the orientation of shoulder 52 and splines 46 within bore 38 of spindle 34. In this orientation, edges 55 align with splines 46 such that faces 54 extend from one side of one spline 46 to the same side of an adjacent spline 46. Detent ball 68 is positioned between two splines 46 such that an edge 55 aligns with the gap between detent ball 68 and spline 46. This orientation of shoulder 52 and splines 46 allows tool bit 22 to be locked into position by rotating tool bit 22 relative to spindle 34 in the direction of arrow 74.

Figure 4B:
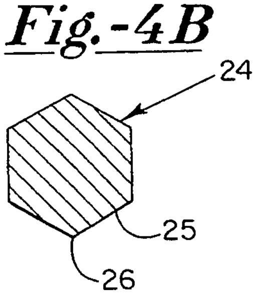
FIG. 4B is a sectional view of the hex shank taken along line 4B—4B in FIG. 4A showing the orientation of the shank within the chuck assembly.
Figure 4A:
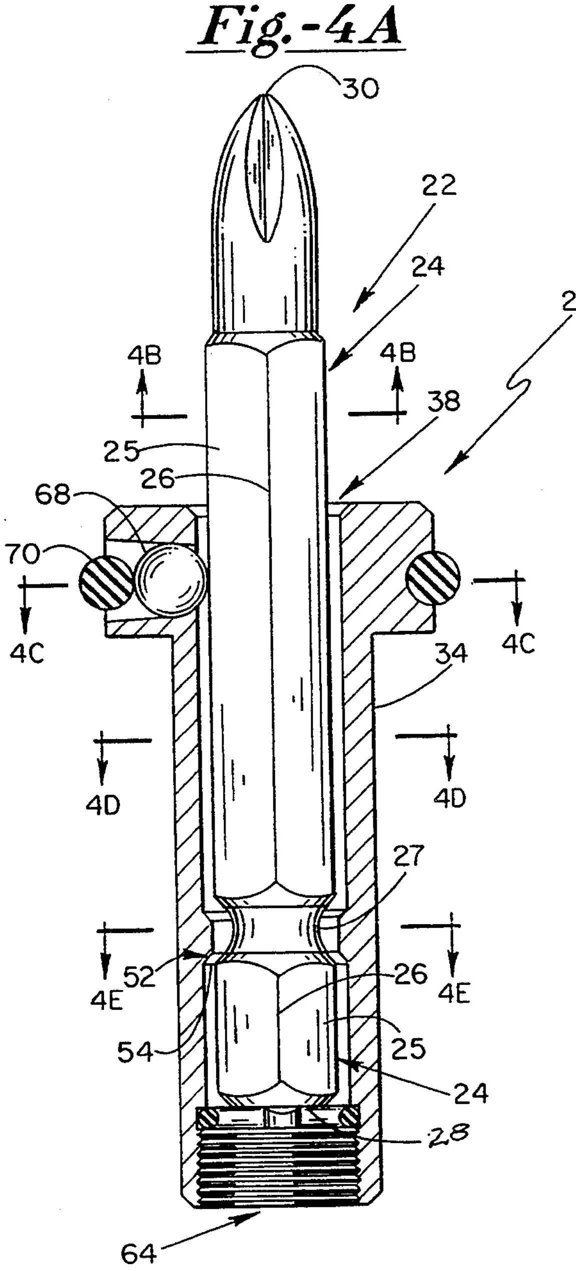
FIG. 4A is a sectional view of the quick change chuck assembly with the tool bit inserted in an unlocked position.

FIG. 4A shows tool bit 22 inserted into bore 38 of spindle 34 in an unlocked position. Tool bit 22 is aligned such that sides 25 of shank 24 align with faces 54 of shoulder 52. In addition, end stop 64 is positioned such that base 28 of the shank 24 contacts end stop 64 when groove 27 is aligned with shoulder 52.

Figure 4C:
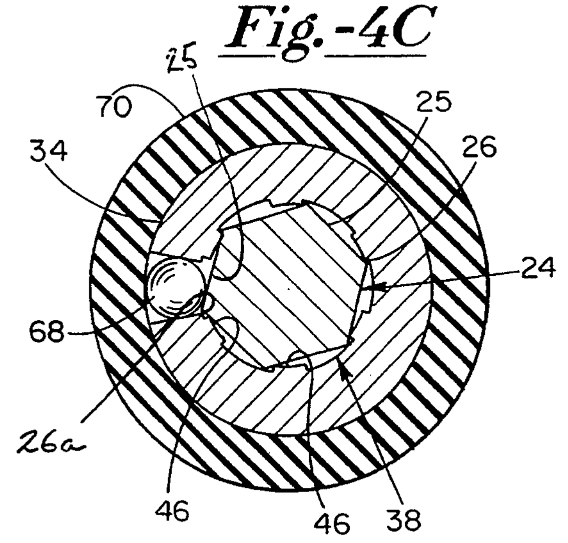
FIG. 4C is a sectional view of the shank and chuck assembly in an unlocked position along line 4C—4C of FIG. 4A.

As best seen in FIG. 4C, in this unlocked position detent ball 68 abuts one side 25 of shank 24 under force applied by O-ring 70.

Figure 5B:
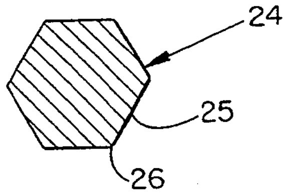
FIG. 5B is a sectional view of the hex shank taken along line 5B—5B in FIG. 5A showing the orientation of the shank within the chuck assembly.
Figure 5A:
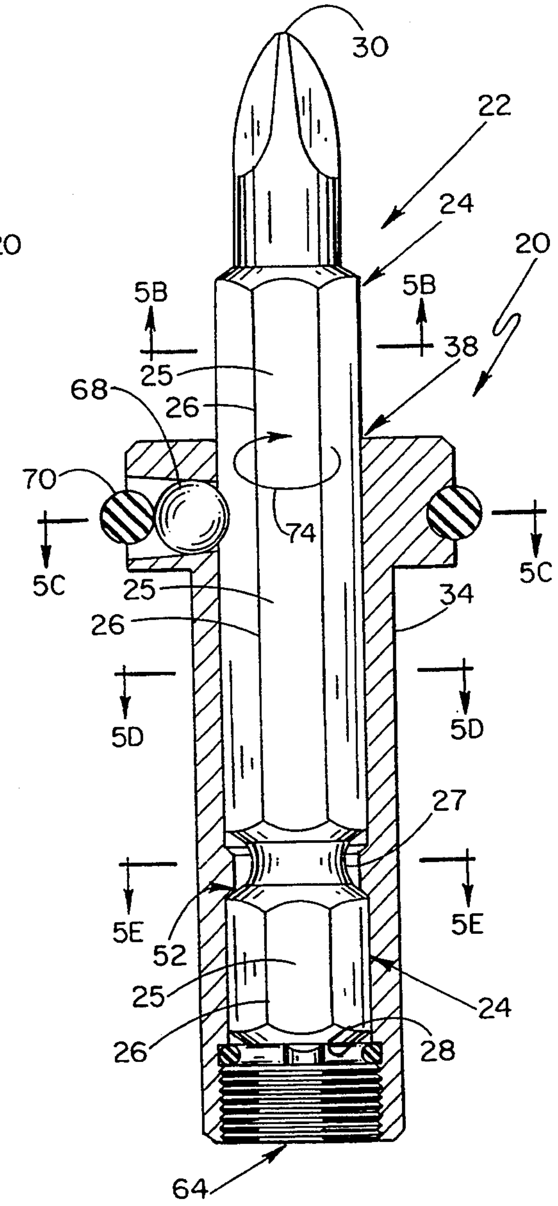
FIG. 5A is a sectional view of the quick change chuck assembly with the tool bit inserted and rotated to a locked position.
Figure 4D:
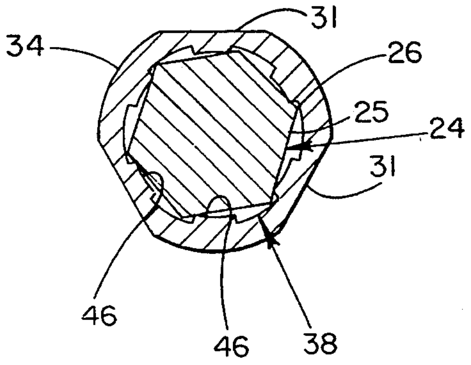
FIG. 4D is a sectional view of the shank and chuck assembly in an unlocked position along line 4D—4D of FIG. 4A.
Figure 4E:
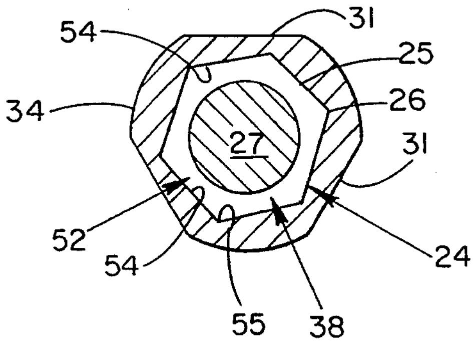
FIG. 4E is a sectional view of the shank and chuck assembly in an unlocked position along line 4E—4E of FIG. 4A.

FIG. 5A shows tool bit 22 and quick change chuck assembly 20 of FIG. 4A, with the tool bit 22 rotated in the direction of arrow 74 to a locked position. FIGS. 4B and 5B show the relative orientation of shank 24 in the unlocked (insertion and removal) and locked positions, respectively. As best seen in FIGS. 4E and 5E, in the locked position, the portion of edges 26 between radiused groove 27 and base 28 of shank 24 are positioned underneath faces 54 of shoulder 52. This orientation of shank 24 and shoulder 52 prevents extraction of tool bit 22 from bore 38. Adjustable end stop 64 is positioned such that edges 26 are held securely between shoulder 52 and end stop 64 when shank 24 is in the locked position. Therefore, the width of shoulder 52 need not match the width of radiused groove 27 to ensure a secure fit. This design allows for greater tolerance in machining both tool bit 22 and quick change chuck assembly 20. Adjustable end stop 64 compensates for lower tolerance requirements by allowing the user to create a secure fit between shoulder 52 and end stop 64 for each tool bit used.

Figure 5C:
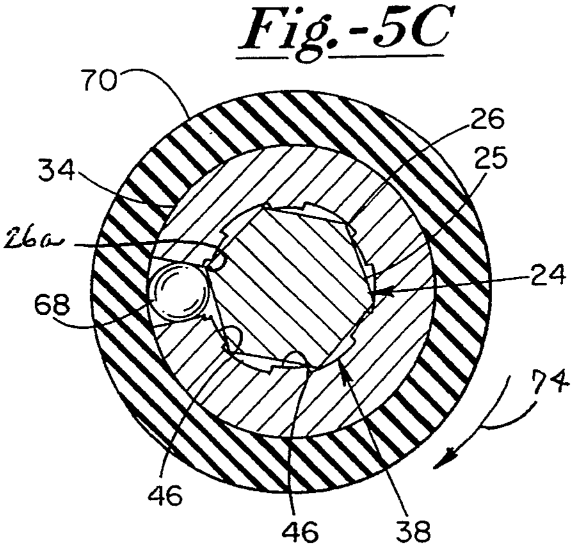
FIG. 5C is a sectional view of the shank and chuck assembly in a locked position along line 5C—5C of FIG. 5A.
Figure 5D:
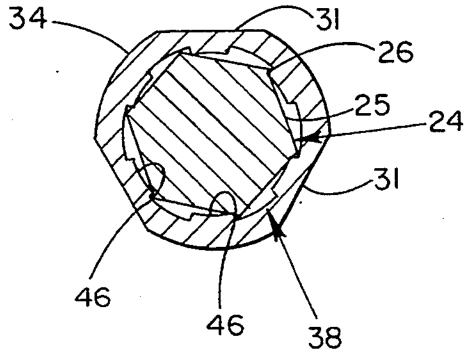
FIG. 5D is a sectional view of the shank and chuck assembly in a locked position along line 5D—5D of FIG. 5A.
Figure 5E:
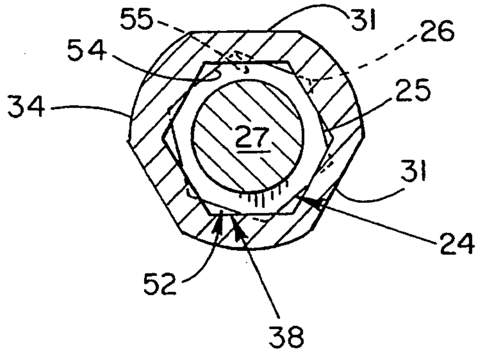
FIG. 5E is a sectional view of the shank and chuck assembly in a locked position along line 5E—5E of FIG. 5E.

In addition, by rotating tool bit 22 in the direction of arrow 74, an edge **26*a* has moved from one side of detent ball 68 (FIG. 4C) to a second side of detent ball 68 (FIG. 5C). Detent ball 68 thus provides a biasing force keeping tool bit 22** in the locked position.

Figure 6:
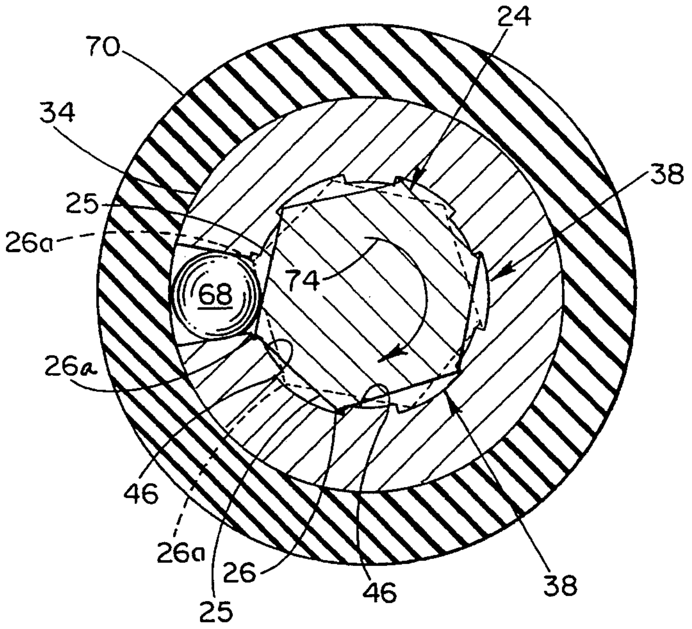
FIG. 6 is an enlarged sectional view of the hex shank, splines and a detent ball within the chuck assembly similar to FIGS. 4C and 5C. The locked position of the shank is shown in phantom.

FIG. 6 shows a greatly enlarged sectional view of shank 24, spindle 34, detent ball 68 and O-ring 70 similar to FIGS. 4C and 5C. The rotated and locked position of shank 24 is shown in phantom. In the unlocked position, an edge **26*a* of shank 24 is positioned between detent ball 68 and one spline 46. By rotating shank 24 in the direction of arrow 74, edge 26*a* moves across detent ball 68 to a position between detent ball 68 and adjacent spline 46, (here shown as phantom 26*a*). During the rotation, edge 26*a* forces detent ball 68 against O-ring 70. As a result, detent ball 68 moves outward within radial bore 66. When edge 26*a* reaches the locked position, detent ball 68 snaps back inward against side 25 under force of O-ring 70. In the locked position, detent ball 68 provides radial force on side 25, thereby preventing shank 24** from rotating back into the unlocked position.

To return shank 24 to the unlocked position (e.g., for removing tool bit 22 from chuck assembly 20 as in FIG. 1), the user rotates shank 24 in the direction opposite arrow 74 with sufficient force to overcome the detent force of detent ball 68. This rotation puts edge **26*a* back in the position indicated by the solid line in FIG. 6. In this position, shank 24 may move longitudinally within bore 38**.

Figure 7:
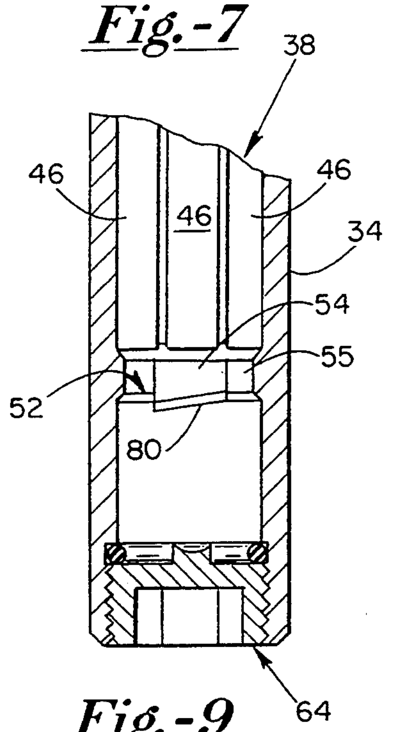
FIG. 7 is a side view of a ramp along a shoulder within the chuck assembly.

While the description of the present invention has thus far focussed on the preferred embodiment, alternative embodiments are also contemplated. FIG. 7 shows an alternative embodiment of shoulder 52 wherein each face 54 has a ramp 80 sloping from the face toward end stop 64. The sloping direction of ramp 80 matches the rotational direction required for locking the shank within spindle 34. Hence, as the shank is rotated within spindle 34, ramp 80 applies an increasing longitudinal force to an edge of the shank, such that the shank is held securely against end stop 64.

Figure 8:
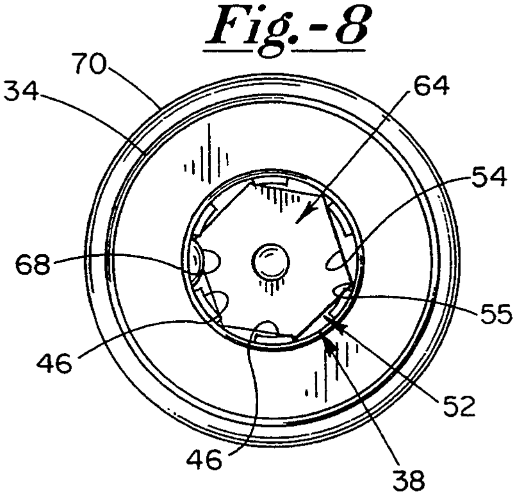
FIG. 8 is an end view, similar to FIG. 3, of an alternative embodiment of the chuck assembly showing the orientation of the shoulder and the splines for a counterclockwise locking rotation.
Figure 9:
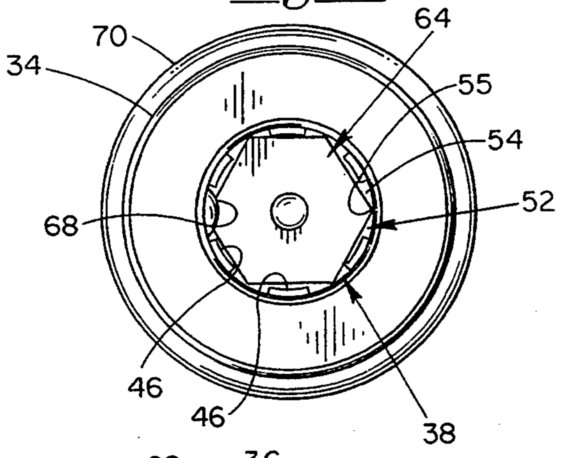
FIG. 9 is an end view, similar to FIG. 3, of an alternative embodiment of the chuck assembly showing the orientation of the shoulder and the splines for a two-way locking rotation.

Alternative orientations of shoulder 52 and splines 46 are also contemplated. As seen in FIG. 8, edges 55 may be positioned against the opposite sides of splines 46 as compared with FIG. 3. With this orientation of shoulder 52 and splines 46, shank 24 must be rotated counterclockwise when looking down into bore 38 to lock shank 24 into place. FIG. 9 shows yet another alternative orientation of shoulder 52 with splines 46. In this orientation, edges 55 are positioned directly between splines 46. This orientation allows rotation of the shank in either the counterclockwise or clockwise direction in order to lock the shank within bore 38.

Figure 10:
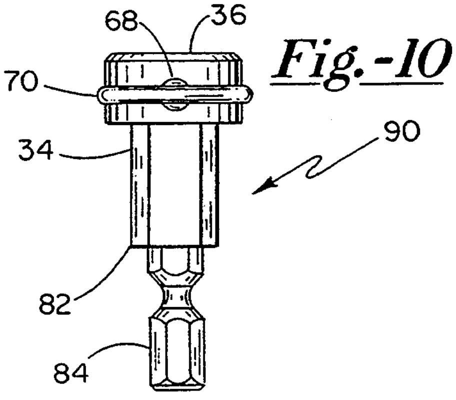
FIG. 10 is an elevational view of an alternative embodiment of the quick change chuck assembly with a hex shank.

Alternative methods of securing of quick change chuck assembly 20 to a drill are also contemplated. As seen in FIG. 10, spindle 34 has a backward face 82 connected to a bit shank 84. Bit shank 84 preferably conforms to ANSI standard B107.4 and fits into a screw gun. The embodiment of FIG. 10 allows quick change chuck assembly 90 to be used with screw guns having powerful detents which make changing tool bits difficult.

Figure 11:
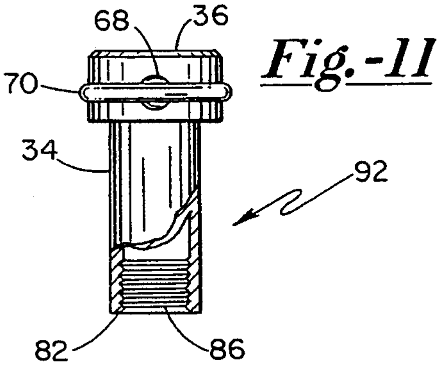
FIG. 11 is an elevational view of an alternative embodiment of the quick change chuck assembly with a threaded bore.

FIG. 11 shows another alternative embodiment of the present invention. Spindle 34 of quick change chuck assembly 92 is adapted to replace an adjustable jaw chuck. In this embodiment, spindle 34 has an internally threaded bore 86 extending inward from backward face 82. Bore 86 enables spindle 34 to be screwed directly onto a standard power drill spindle.

The quick change chuck assembly provides a smaller and simpler system for adapting standard drill chucks to a quick change configuration. The assembly requires fewer movements when inserting and removing tool bit shanks as no manipulation of the assembly is required. In addition, there are no moving parts within the assembly that operate to lock the shank within the bore. As a result, the assembly is easier to manufacture and more reliable. Finally, the assembly is smaller in dimension and extends only slightly beyond the outside of the existing drill chuck.

Although the present invention has been described with reference to preferred embodiments, workers skilled in the art will recognize that changes may be made in form and detail without departing from the spirit and scope of the invention.

What is claimed is:

1. A quick change chuck assembly for tool bits having a shank with a plurality of sides, the sides separated by a plurality of edges, and a groove with a radiused portion extending circumferentially about the shank, the chuck assembly comprising:

a spindle having a forward face;

a longitudinal bore into the spindle from the forward face having an inner wall for receiving the shank of the tool bit;

a first segment of the inner wall, the first segment having a first end and a second end, the first end adjacent the forward face, the first segment having a plurality of splines extending longitudinally along the bore for engaging the shank;

a second segment of the inner wall, the second segment having a first end and a second end, the first end of the second segment adjacent to the second end of the first segment, the second segment having a radially inwardly extending shoulder for receiving the shank, the shoulder having a plurality of faces, the number of faces less than or equal to the number of edges of the shank;

a third segment of the inner wall, the third segment having a first end and a second end, the first end of the third segment adjacent to the second end of the second segment, the second end of the third segment having an end stop positioned within the bore;

wherein the shank may be inserted into the longitudinal bore through the first and second segments and into the third segment such that the groove of the shank is aligned with the shoulder of the second segment and a base of the shank is adjacent the end stop in the third segment; and wherein the shank may be rotated such that a lower edge of the shank between the groove and the base is positioned securely between a face of the shoulder and the end stop, thereby locking the shank of the tool bit in position and preventing longitudinal movement of the tool bit within the longitudinal bore.

2. The chuck assembly of claim 1 wherein the spindle further includes a biasing mechanism for holding the shank in the locked position and for orienting the shank as it enters the bore.

3. The chuck assembly of claim 2 wherein the biasing mechanism comprises:

a radial bore communicating with the longitudinal bore through the spindle, the radial bore positioned on the inner wall between two splines of the first segment;

a detent ball disposed within the radial bore; and a biasing means urging the detent ball into the longitudinal bore.

4. The chuck assembly of claim 3 wherein the biasing means comprises:

a circumferential groove about an exterior surface of the spindle communicating with the radial bore; and an O-ring positioned within the circumferential groove urging the detent ball into the longitudinal bore.

5. The chuck assembly of claim 1 wherein a ramp is positioned on at least one face of the shoulder, the ramp sloping such that, when the shank is rotated to the locked position, the ramp applies a longitudinal force to the shank whereby the shank is held securely against the end stop.

6. The chuck assembly of claim 1 wherein the splines limit the rotational movement of the shank within the longitudinal bore.

7. The chuck assembly of claim 1 wherein the first segment and the second segment are aligned such that the shank rotates in a counterclockwise direction for locking.

8. The chuck assembly of claim 1 wherein the first segment and the second segment are aligned such that the shank rotates in a clockwise direction for locking.

9. The chuck assembly of claim 1 wherein the first segment and the second segment are aligned such that the shank rotates in either a clockwise or a counterclockwise direction for locking.

10. The chuck assembly of claim 1 wherein the first segment comprises six evenly spaced splines for receiving the shank of a tool bit conforming to ANSI standard B107.4, the tool bit having a hex-shaped shank.

11. The chuck assembly of claim 10 wherein the shoulder of the second segment has six evenly sized faces for receiving the hex-shaped shank.

12. The chuck assembly of claim 1 wherein the spindle is adapted to fit into an adjustable jaw chuck.

13. The chuck assembly of claim 1 wherein the spindle further comprises an internally threaded bore into the spindle from a backward face for replacing an adjustable jaw chuck.

14. The chuck assembly of claim 1 wherein the spindle further comprises a power bit shaft extending from a backward face for use with a screwgun.

15. The chuck assembly of claim 1 wherein the third segment of the inner wall has a plurality of splines less than or equal to the plurality of splines in the first segment and longitudinally aligned with splines in the first segment.

16. The chuck assembly of claim 1 wherein the end stop threadably engages the third segment such that the position of the end stop may be adjusted within the longitudinal bore.

* * * * *